United States Patent
Souma

(10) Patent No.: US 9,164,259 B2
(45) Date of Patent: Oct. 20, 2015

(54) ZOOMING OPTICAL SYSTEM, IMAGING OPTICAL DEVICE, AND DIGITAL DEVICE

(71) Applicant: KONICA MINOLTA, INC., Tokyo (JP)

(72) Inventor: Yoshihito Souma, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/206,488

(22) Filed: Mar. 12, 2014

(65) Prior Publication Data

US 2015/0085153 A1 Mar. 26, 2015

(30) Foreign Application Priority Data

Sep. 25, 2013 (JP) ................................. 2013-198787

(51) Int. Cl.
| | |
|---|---|
| G02B 15/14 | (2006.01) |
| G02B 13/00 | (2006.01) |
| H04N 5/232 | (2006.01) |
| G02B 27/00 | (2006.01) |
| G02B 15/173 | (2006.01) |
| G02B 9/60 | (2006.01) |
| G02B 13/18 | (2006.01) |

(52) U.S. Cl.
CPC ............ *G02B 13/009* (2013.01); *G02B 15/173* (2013.01); *G02B 27/0062* (2013.01); *H04N 5/23296* (2013.01); *G02B 9/60* (2013.01); *G02B 13/0015* (2013.01); *G02B 13/0045* (2013.01); *G02B 13/18* (2013.01); *G02B 15/14* (2013.01)

(58) Field of Classification Search
CPC ...... G02B 13/0045; G02B 9/60; G02B 13/18; G02B 15/14; G02B 13/0015; G02B 13/009
USPC .......................... 359/683–687, 714, 740, 764
See application file for complete search history.

(56) References Cited

U.S. PATENT DOCUMENTS

| 4,861,145 | A | 8/1989 | Kikuchi |
|---|---|---|---|
| 2010/0091382 | A1 | 4/2010 | Arai |
| 2011/0273780 | A1 | 11/2011 | Hosoi et al. |
| 2013/0093940 | A1* | 4/2013 | Matsumura .................. 359/683 |

FOREIGN PATENT DOCUMENTS

| EP | 1 857 852 | 11/2007 |
|---|---|---|
| JP | 2009-271471 | 11/2009 |
| JP | 2011-221422 | 11/2011 |
| JP | 2011-237588 | 11/2011 |

* cited by examiner

*Primary Examiner* — Evelyn A Lester
(74) *Attorney, Agent, or Firm* — Cozen O'Connor

(57) ABSTRACT

A zooming optical system has, from the object side, a positive first group, a negative second group, a positive third group, a positive fourth group, and a negative fifth group. During zooming, at least the third to fifth groups move relative to the image plane, and focusing is achieved by moving the fourth group along the optical axis. The conditional formula $-1.0 < M5/f5 < -0.1$ is fulfilled, where M5 is the distance along the optical axis from the position of the fifth group at the wide-angle end to the position of the fifth group at the telephoto end and f5 is the focal length of the fifth group.

16 Claims, 9 Drawing Sheets

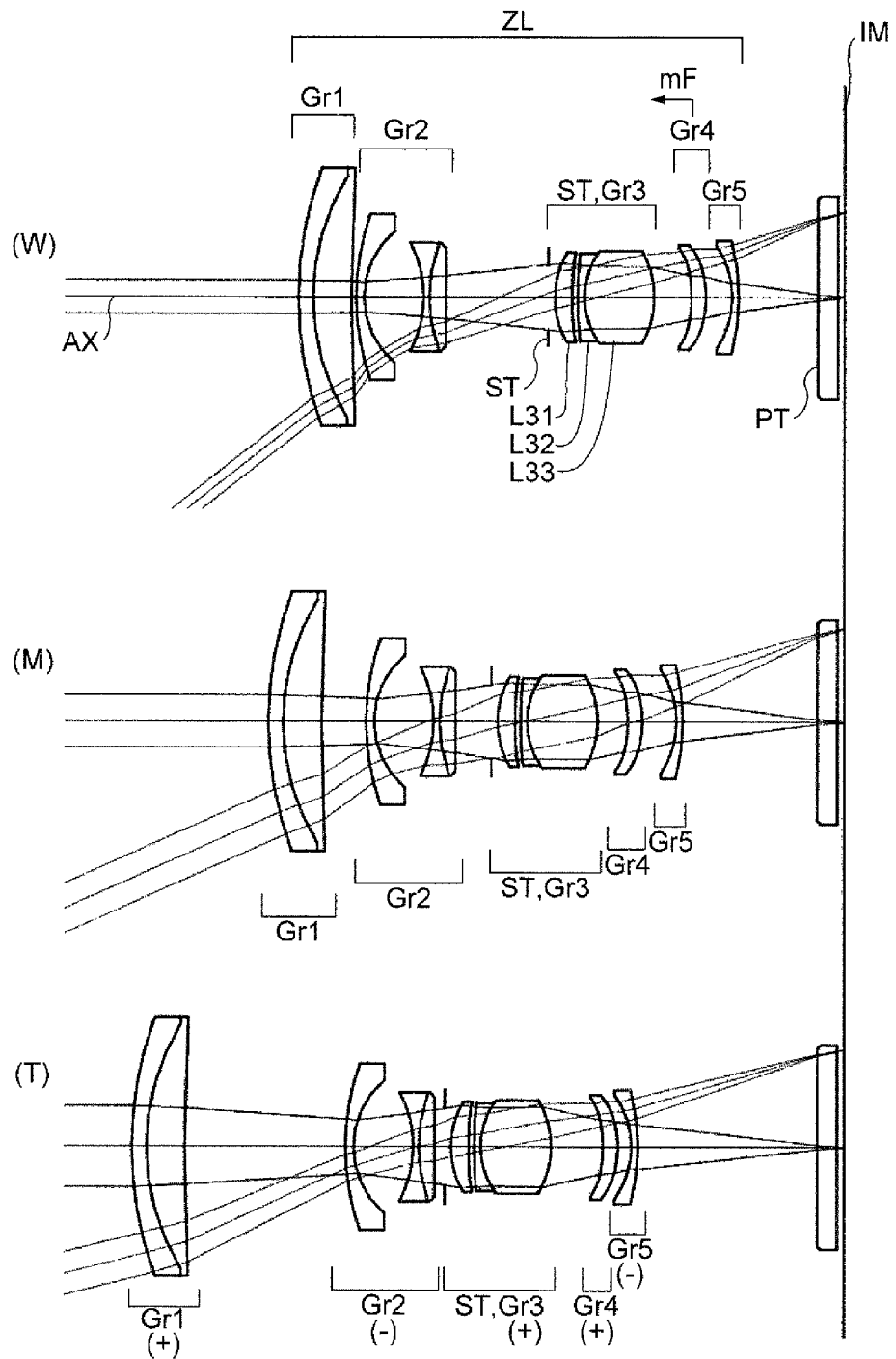

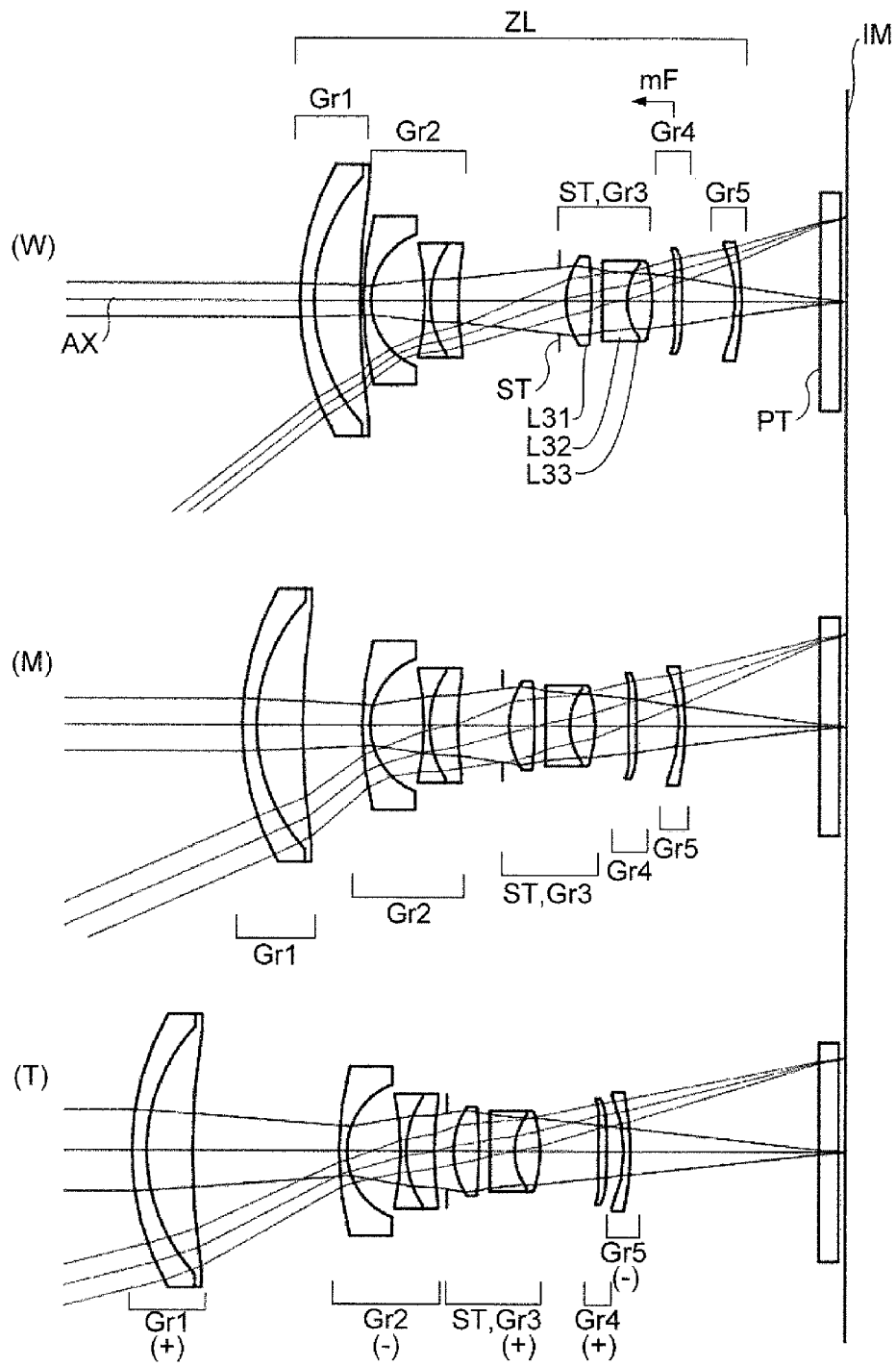

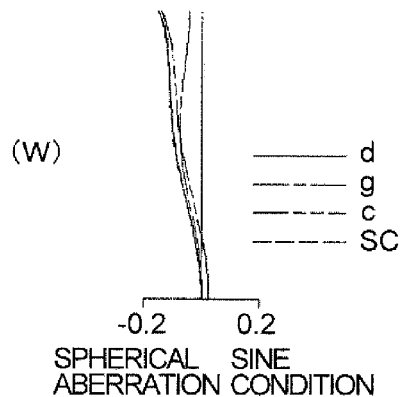
FIG.5A (EX1)
FNO=3.55
(W)
SPHERICAL SINE
ABERRATION CONDITION
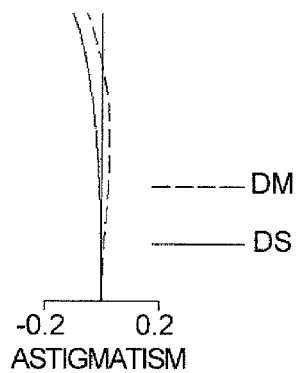
FIG.5B (EX1)
Y'=14.2
ASTIGMATISM
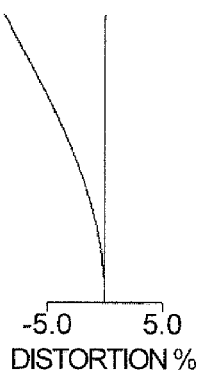
FIG.5C (EX1)
Y'=14.2
DISTORTION %
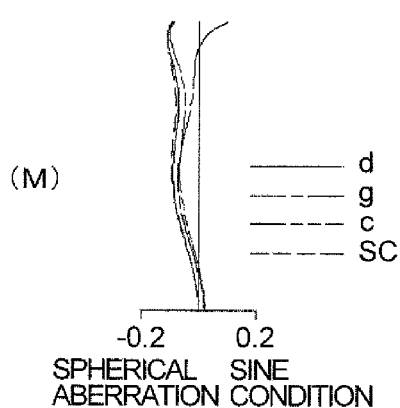
FIG.5D (EX1)
FNO=4.00
(M)
SPHERICAL SINE
ABERRATION CONDITION
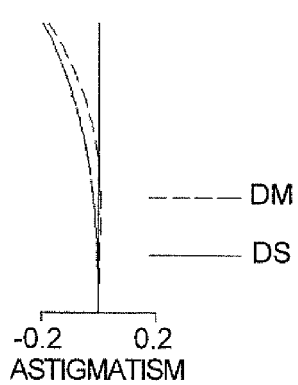
FIG.5E (EX1)
Y'=14.2
ASTIGMATISM
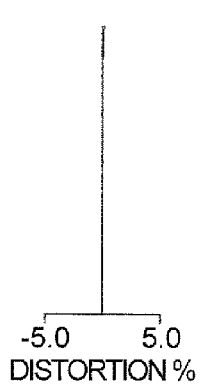
FIG.5F (EX1)
Y'=14.2
DISTORTION %
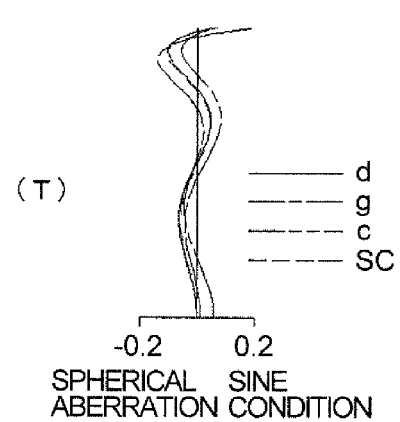
FIG.5G (EX1)
FNO=4.55
(T)
SPHERICAL SINE
ABERRATION CONDITION
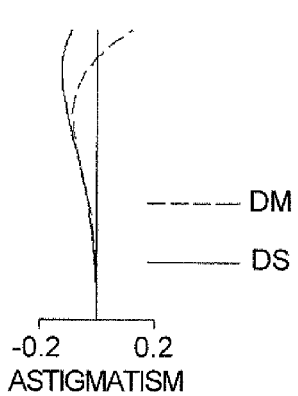
FIG.5H (EX1)
Y'=14.2
ASTIGMATISM
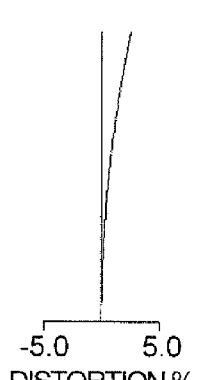
FIG.5I (EX1)
Y'=14.2
DISTORTION %

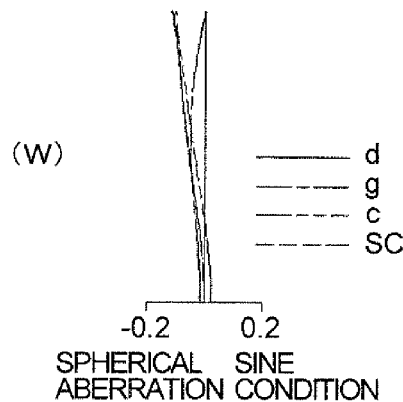
FIG.6A (EX2)
FNO=3.55
(W)
SPHERICAL SINE
ABERRATION CONDITION
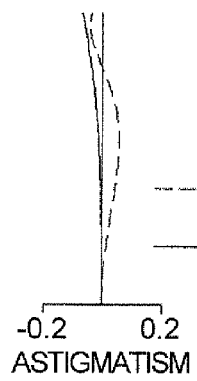
FIG.6B (EX2)
Y'=14.2
ASTIGMATISM
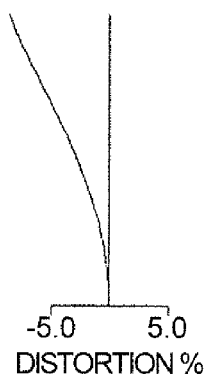
FIG.6C (EX2)
Y'=14.2
DISTORTION %
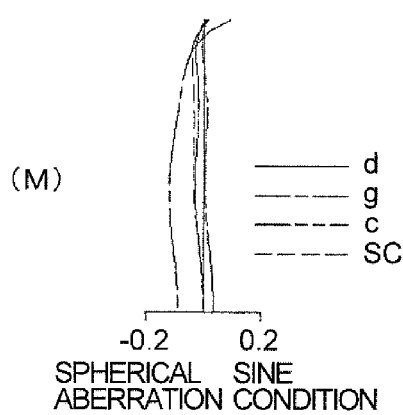
FIG.6D (EX2)
FNO=4.00
(M)
SPHERICAL SINE
ABERRATION CONDITION
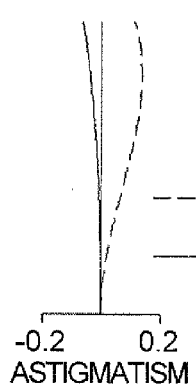
FIG.6E (EX2)
Y'=14.2
ASTIGMATISM
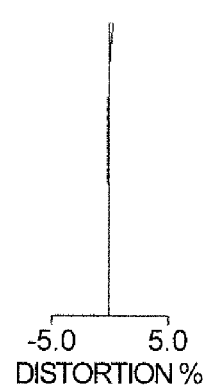
FIG.6F (EX2)
Y'=14.2
DISTORTION %
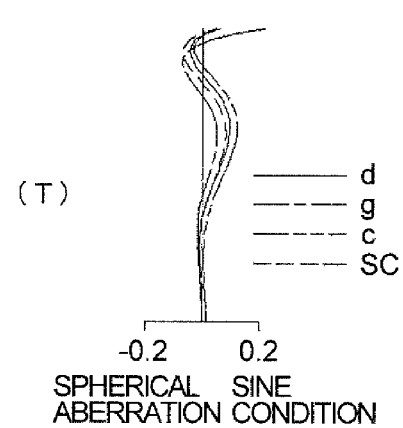
FIG.6G (EX2)
FNO=4.55
(T)
SPHERICAL SINE
ABERRATION CONDITION
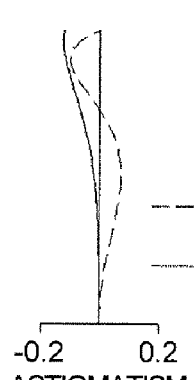
FIG.6H (EX2)
Y'=14.2
ASTIGMATISM
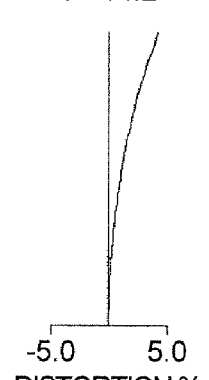
FIG.6I (EX2)
Y'=14.2
DISTORTION %

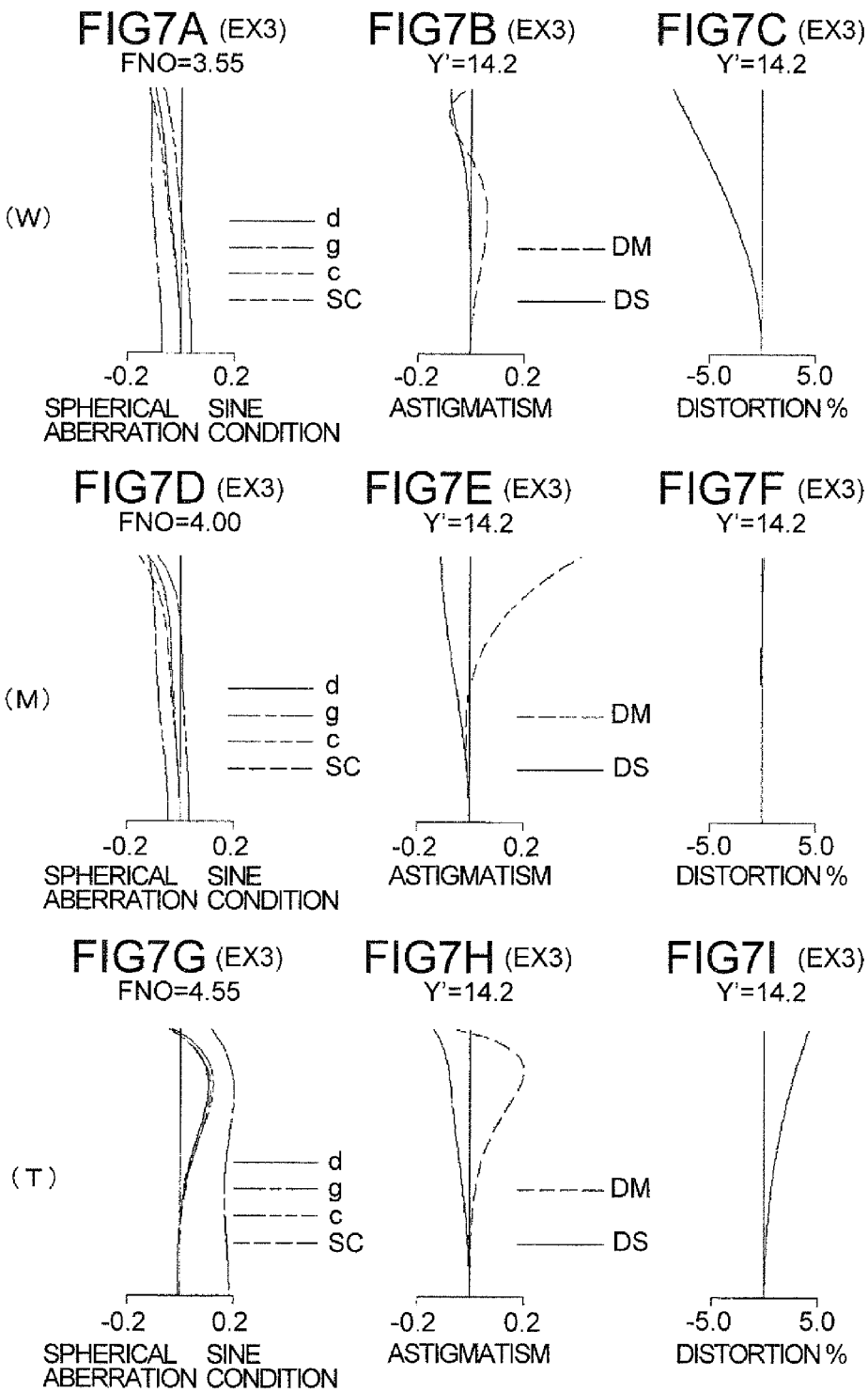

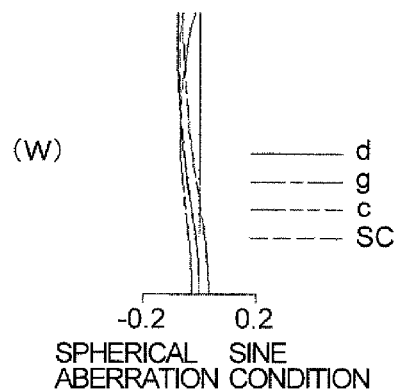
FIG.8A (EX4)
FNO=3.55
(W)
SPHERICAL ABERRATION / SINE CONDITION
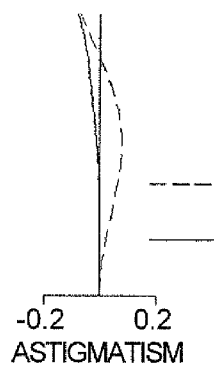
FIG.8B (EX4)
Y'=14.2
ASTIGMATISM
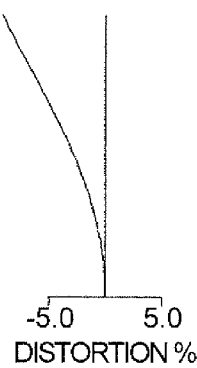
FIG.8C (EX4)
Y'=14.2
DISTORTION %
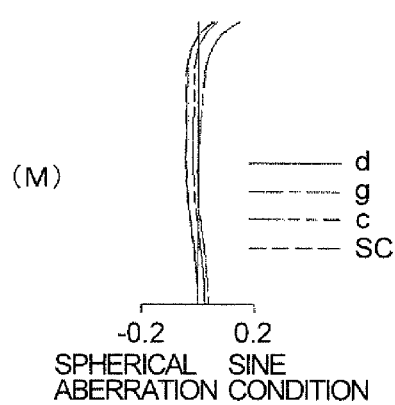
FIG.8D (EX4)
FNO=4.00
(M)
SPHERICAL ABERRATION / SINE CONDITION
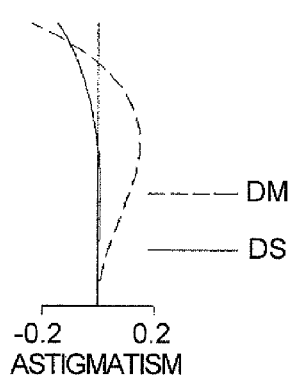
FIG.8E (EX4)
Y'=14.2
ASTIGMATISM
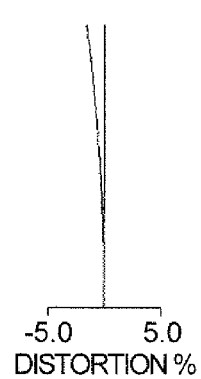
FIG.8F (EX4)
Y'=14.2
DISTORTION %
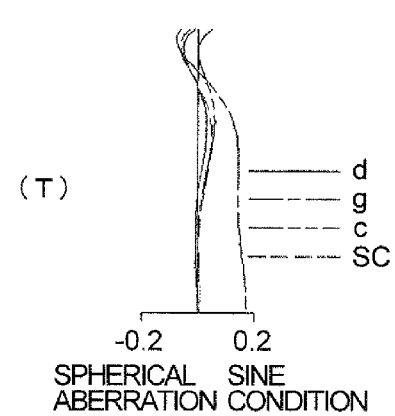
FIG.8G (EX4)
FNO=4.55
(T)
SPHERICAL ABERRATION / SINE CONDITION
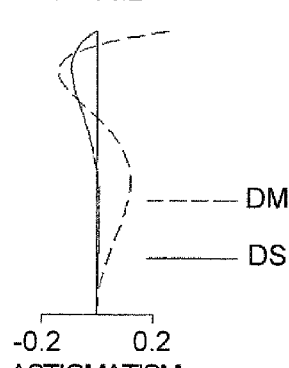
FIG.8H (EX4)
Y'=14.2
ASTIGMATISM
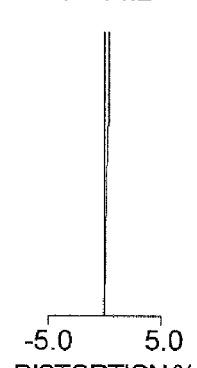
FIG.8I (EX4)
Y'=14.2
DISTORTION %

ZOOMING OPTICAL SYSTEM, IMAGING OPTICAL DEVICE, AND DIGITAL DEVICE

The present application is based on, and claims priority from, Japanese Patent Application No. 2013-198787, filed on Sep. 25, 2013, the disclosure of which is hereby incorporated by reference herein in its entirety.

BACKGROUND OF THE INVENTION

1. Field of the Invention

The present invention relates to zooming optical systems, imaging optical devices, and digital devices. For example, the present invention relates to compact zooming optical systems suitable for interchangeable-lens digital cameras that capture an image of a subject by use of an image sensing device, imaging optical devices that output in the form of an electrical signal the image of the subject captured by the zooming optical system and the image sensing device, and digital devices equipped with an image input function, such as digital cameras, that incorporate such imaging optical devices.

2. Description of Related Art

In conventional zooming optical systems used as interchangeable lenses for single-lens-reflex cameras, the mainstream zoom types have been a positive-negative-positive-positive type as disclosed in Patent Document 1 listed below and a positive-negative-positive-negative-positive type as disclosed in Patent Documents 2 and 3 listed below. On the other hand, in recent years, mirrorless interchangeable-lens cameras, which no longer have a swing-up mirror as is provided in single-lens-reflex cameras, have been gaining acceptance among users for their compactness, and their market has been growing. In those mirrorless cameras, it is aimed at to effectively exploit the space that would have been reserved for a mirror, in order to achieve further improved compactness in the state with a lens attached, that is, to provide an optical solution that exploits the shorter lens back in order to make the optical system compact.

Patent Document 1: Japanese Patent Application Publication No. 2009-271471
Patent Document 2: Japanese Patent Application Publication No 2011-221422
Patent Document 3: Japanese Patent Application Publication No. 2011-237588

In this respect, the lens systems disclosed in Patent Documents 1 and 2 mentioned above, which provide optical solutions on the assumption that a mirror space has to be reserved, cannot be said to be satisfactorily compact. On the other hand, Example 1 disclosed in Patent Document 3 does not assume reservation of a mirror space, and realizes a compact optical system as a whole with a shorter lens back than ever. However, the movement amounts of individual groups are large, and thus it still cannot be said that satisfactory compactness is achieved.

SUMMARY OF THE INVENTION

Against the background discussed above, the present invention aims to provide a high-performance zooming optical system having an optical system that is compact in size as a whole, and to provide an imaging optical device and a digital device provided with such a zooming optical system.

According to one aspect of the invention, a zooming optical system is provided with, from the object side, a first group having a positive optical power, a second group having a negative optical power, a third group having a positive optical power, a fourth group having a positive optical power, and a fifth group having a negative optical power. The zooming optical system achieves zooming by varying the axial distances between the individual groups. Here, during zooming, at least the third, fourth, and fifth groups move relative to the image plane, and focusing is achieved by moving the fourth group along the optical axis. Moreover, conditional formula (1) below is fulfilled:

$$-1.0 < M5/f5 < -0.1 \tag{1}$$

where
M5 represents the distance along the optical axis from the position of the fifth group at the wide-angle end to the position of the fifth group at the telephoto end; and
f5 represents the focal length of the fifth group.

According to another aspect of the invention, an imaging optical device is provided with: a zooming optical system as described above; and an image sensing device for converting an optical image formed on a light receiving surface into an electrical signal. Here, the zooming optical system is arranged such that an optical image of a subject is formed on the light receiving surface of the image sensing device.

According to yet another aspect of the invention, a digital device is provided with an imaging optical device as described above so as to be additionally equipped with at least a function of taking a still picture of the subject or a function of taking a moving picture of the subject.

BRIEF DESCRIPTION OF THE DRAWINGS

FIG. 3 is an optical construction diagram of a third embodiment (Example 3) according to the invention;
FIG. 4 is an optical construction diagram of a fourth embodiment (Example 4) according to the invention;
FIGS. 5A to 5I are aberration diagrams of Example 1;
FIGS. 6A to 6I are aberration diagrams of Example 2;
FIGS. 7A to 7I are aberration diagrams of Example 3;
FIGS. 8A to 8I are aberration diagrams of Example 4.

DETAILED DESCRIPTION OF PREFERRED EMBODIMENTS

Figure 1:
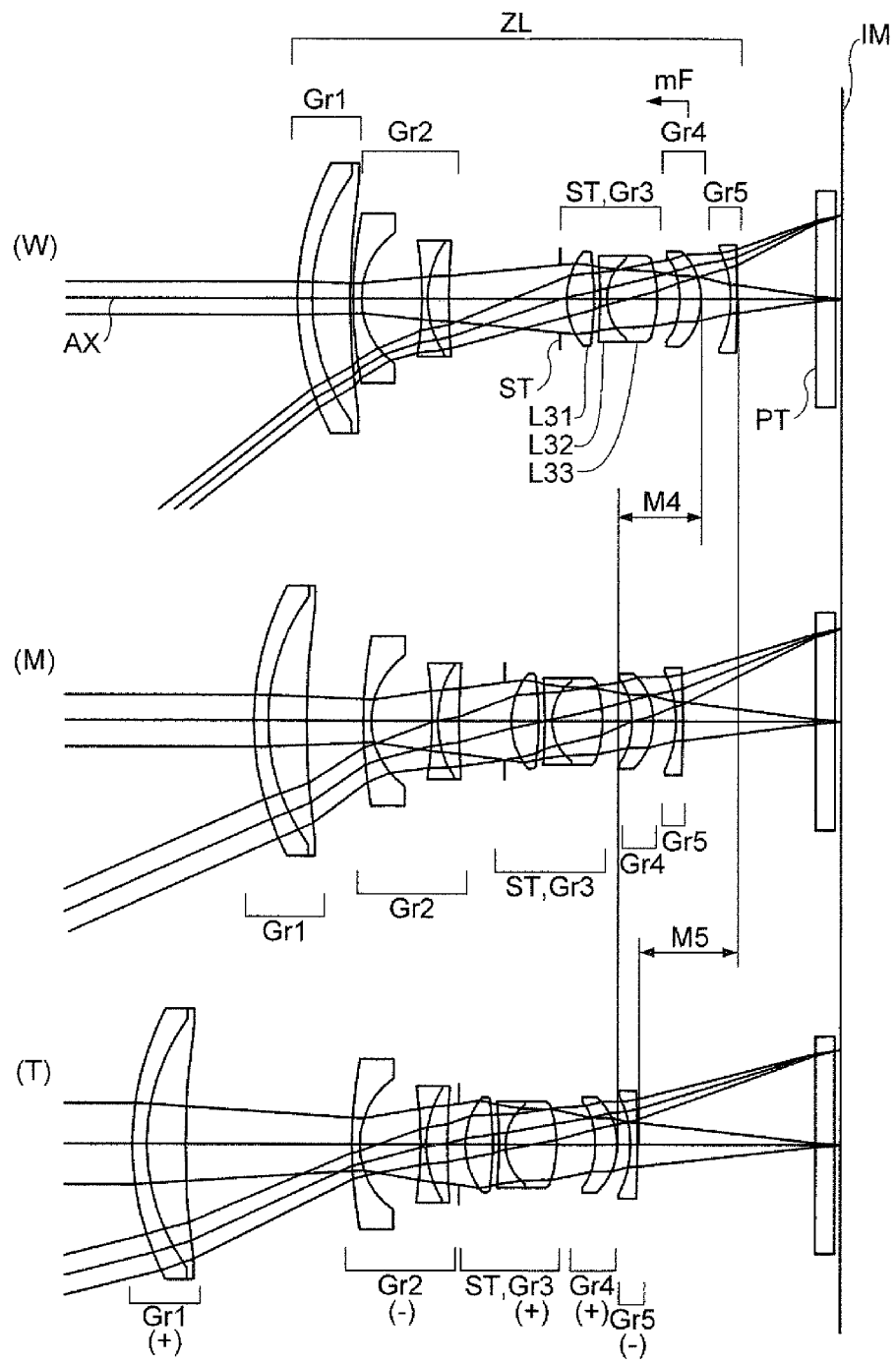
FIG. 1 is an optical construction diagram of a first embodiment (Example 1) according to the invention.
Figure 2:
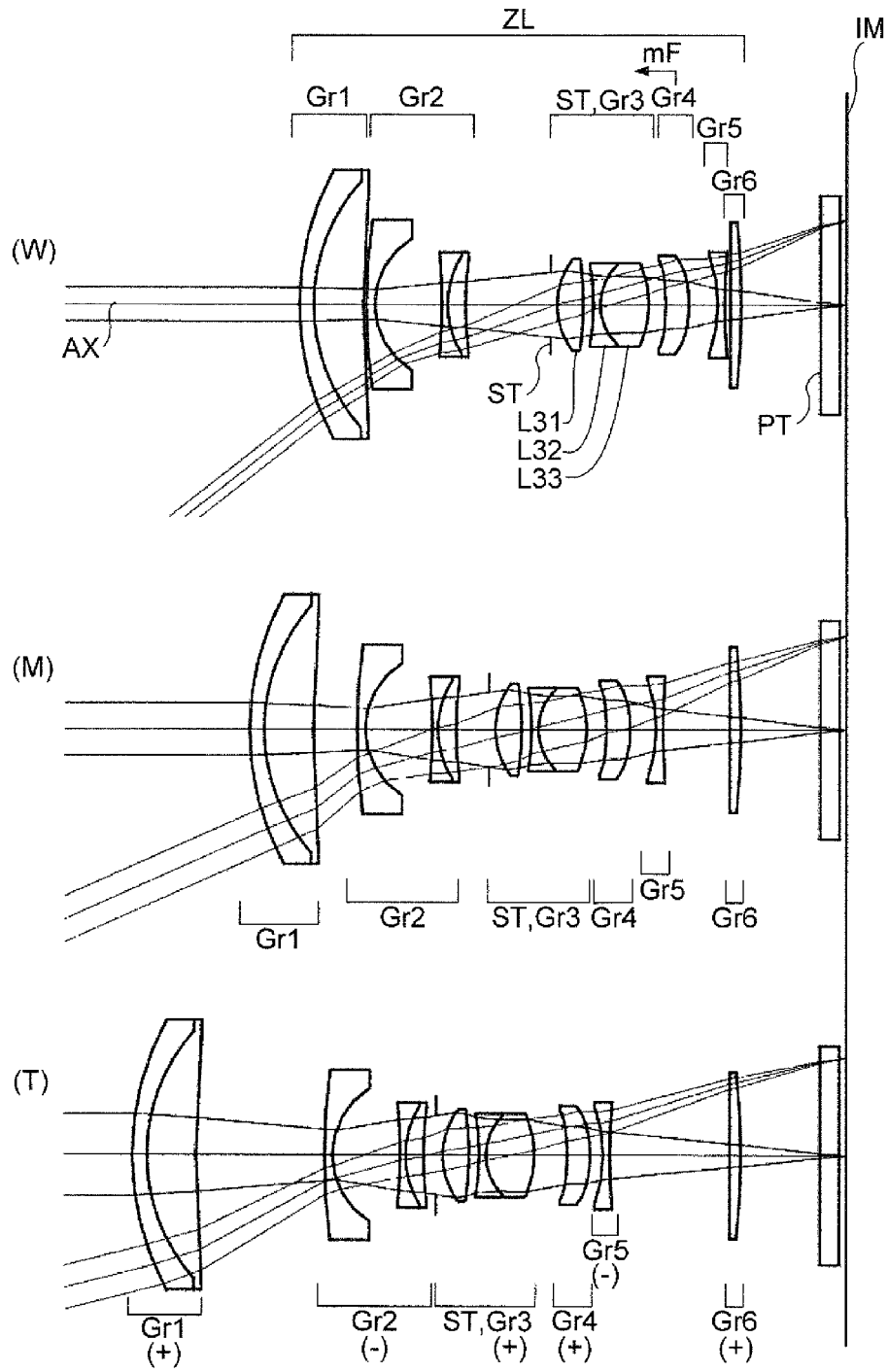
FIG. 2 is an optical construction diagram of a second embodiment (Example 2) according to the invention.

Hereinafter, zooming optical systems, imaging optical devices, and digital devices according to the present invention will be described. A zooming optical system according to the invention is a zooming optical system that includes, from the object side, a first group having a positive optical power, a second group having a negative optical power, a third group having a positive optical power, a fourth group having a positive optical power, and a fifth group having a negative optical power (an optical power being a quantity defined as the reciprocal of a focal length) and that achieves zooming by varying the axial distances between those groups, and is so configured that, during zooming, at least the third, fourth, and fifth groups move relative to the image plane and that focusing is achieved by moving the fourth group along the optical axis.

Adopting a power arrangement as described above, namely a positive-negative-positive-positive-negative power arrangement from the object side, makes it difficult to secure a satisfactory lens back due to the negative optical power of the fifth group, but helps shorten the composite focal length of the first to fourth groups. That is, it is possible to reduce the size of the optical system of the first to fourth groups to achieve compactness. Here, by fulfilling conditional formula (1) below and thereby properly setting the ratio of the focal length of the fifth group to its movement amount, it is possible to make the optical system as a whole compact and simultaneously achieve high performance.

$$-1.0 < M5/f5 < -0.1 \quad (1)$$

where
M5 represents the distance along the optical axis from the position of the fifth group at the wide-angle end to the position of the fifth group at the telephoto end (see FIG. 1); and
f5 represents the focal length of the fifth group.

Below the lower limit of conditional formula (1), the optical power of the fifth group is too high, or the movement amount of the fifth group is too large. Consequently, disadvantageously, it is difficult to suppress variation in astigmatism and coma aberration that accompanies the movement of the fifth group. By contrast, above the upper limit of conditional formula (1), the movement amount of the fifth group is too small, or the optical power of the fifth group is too low. Consequently, the zooming action by the fifth group is insufficient. As a result, to achieve the desired zooming, it is necessary to increase the zooming action between the first and second groups. This requires an increase in the total length of the optical system at the telephoto end or, to avoid that, an increase in the optical power of the second group, and thus makes it difficult to suppress variation in astigmatism and coma aberration during zooming.

With the distinctive construction described above, the conditions for making the optical system as a whole compact while maintaining high optical performance are properly set, and thus it is possible to realize a compact, high-performance zooming optical system and hence a compact, high-performance imaging optical device. By employing such a compact zooming optical system or imaging optical device in a digital device such as a digital camera, it is possible to add a high-performance image input function to the digital device in a compact fashion, and this contributes to making digital devices compact, low-cost, high-performance, versatile, and otherwise improve them. For example, a zooming optical system according to the invention is suitable as an interchangeable lens in mirrorless interchangeable-lens digital cameras, and thus helps realize light-weight, compact interchangeable lenses that are convenient to carry around. Now, the conditions and other features for obtaining those benefits with a good balance and for achieving still higher optical performance, further compactness, etc. will be discussed below.

It is further preferable that a zooming optical system according to the invention fulfill conditional formula (1a) below.

$$-0.7 < M5/f5 < -0.2 \quad (1a)$$

This conditional formula (1a) defines, within the conditional range defined by conditional formula (1) above, a conditional range further preferable from the above-mentioned and other standpoints. Accordingly, preferably, fulfilling conditional formula (1a) helps obtain the above-mentioned benefits more effectively.

It is preferable that the third and fifth groups move as a single unit during zooming. A construction where the third and fifth groups are moved as a single unit during zooming permits the third and fifth groups to be mounted on a single moving member. With such a construction, therefore, it is possible to reduce factors associated with manufacturing errors and thereby alleviate degradation in performance due to manufacturing errors.

It is preferable that, during zooming, the third group, the driving member for moving the fourth group for focusing, and the fifth group move as a single unit, and it is further preferable that, during zooming, the driving member varies the axial distance between the third and fourth groups and the axial distance between the fourth and fifth groups. A construction where the third group, the fourth group driving member, and the fifth group move as a single unit during zooming permits the third group, the fourth group driving member, and the fifth group to be mounted on a single movable group. With such a construction, in a lens system adopting so-called manual zooming that is purely mechanical, depending on the focus condition, an abrupt zooming operation by the user may cause the focusing lens group to collide with the adjacent lens group. Thus, measures need to be taken so that collision will not bring destruction of the lens system. On the other hand, with the above-described construction where the third group, the fourth group driving member, and the fifth group are mounted on a single movable group, it is possible to absolutely guarantee that the fourth group will not collide with the third or fifth group. This eliminates the need for any such measures as mentioned above, and thus helps simplify the mechanism.

It is preferable that a zooming optical system according to the invention fulfill conditional formula (2) below.

$$-6.0 < f5/fw < -1.0 \quad (2)$$

where
f5 represents the focal length of the fifth group; and
fw represents the focal length of the zooming optical system at the wide-angle end.

Below the lower limit of conditional formula (2), the optical power of the fifth group is too low. Consequently, disadvantageously, its effect of cancelling the large negative distortion occurring in the second group at the wide-angle end is insufficient. By contrast, above the upper limit of conditional formula (2), the optical power of the fifth group is too high. Consequently, disadvantageously, it is difficult to suppress variation in astigmatism and coma aberration that accompanies the movement of the fifth group.

It is further preferable that a zooming optical system according to the invention fulfill conditional formula (2a) below.

$$-5.5 < f5/fw < -1.1 \quad (2a)$$

This conditional formula (2a) defines, within the conditional range defined by conditional formula (2) above, a conditional range further preferable from the above-mentioned and other standpoints. Accordingly, preferably, fulfilling conditional formula (2a) helps obtain the above-mentioned benefits more effectively.

It is preferable that a zooming optical system according to the invention fulfill conditional formula (3) below.

$$1.0 < f4/f3 < 6.0 \quad (3)$$

where
f3 represents the focal length of the third group; and
f4 represents the focal length of the fourth group.

Below the lower limit of conditional formula (3), the optical power of the fourth group is too high relative to that of the third group. Consequently, it is difficult to suppress variation in astigmatism that accompanies the movement of the fourth group during focusing. By contrast, above the upper limit of conditional formula (3), the greater part of the converging action of the optical system is borne by the third group. Consequently, disadvantageously, the third group produces increased spherical and coma aberrations.

It is further preferable that a zooming optical system according to the invention fulfill conditional formula (3a) below.

$$2.0 < f4/f3 < 4.0 \tag{3a}$$

This conditional formula (3a) defines, within the conditional range defined by conditional formula (3) above, a conditional range further preferable from the above-mentioned and other standpoints. Accordingly, preferably, fulfilling conditional formula (3a) helps obtain the above-mentioned benefits more effectively.

It is preferable that a zooming optical system according to the invention fulfill conditional formula (4) below.

$$-6.0 < f5/f3 < -0.8 \tag{4}$$

where
f3 represents the focal length of the third group; and
f5 represents the focal length of the fifth group.

Below the lower limit of conditional formula (4), the optical power of the fifth group is too low relative to that of the third group. Consequently, the zooming action by the movement of the fifth group is insufficient. By contrast, above the upper limit of conditional formula (4), the optical power of the fifth group is too high relative to that of the third group. Consequently, it is difficult to bring the rear principal point position of the entire optical system at the wide-angle end close to the image plane, and thus it is difficult to obtain the desired focal length at the wide-angle end.

It is further preferable that a zooming optical system according to the invention fulfill conditional formula (4a) below.

$$-5.0 < f5/f3 < -1.0 \tag{4a}$$

This conditional formula (4a) defines, within the conditional range defined by conditional formula (4) above, a conditional range further preferable from the above-mentioned and other standpoints. Accordingly, preferably, fulfilling conditional formula (4a) helps obtain the above-mentioned benefits more effectively.

It is preferable that a zooming optical system according to the invention fulfill conditional formula (5) below.

$$0.5 < M4/M5 < 1.0 \tag{5}$$

where
M4 represents the distance along the optical axis from the position of the fourth group at the wide-angle end to the position of the fourth group at the telephoto end; and
M5 represents the distance along the optical axis from the position of the fifth group at the wide-angle end to the position of the fifth group at the telephoto end (see FIG. 1).

Below the lower limit of conditional formula (5), the movement amount of the fourth group is too small relative to the movement amount of the fifth group. Consequently, to secure the movement amount of the fifth group necessary to obtain the desired zooming action, it is necessary to secure a large distance between the fourth and fifth groups at the wide-angle end. As a result, the rear principal point position of the entire optical system is located away from the image plane, and this makes it difficult to obtain the desired focal length at the wide-angle end. By contrast, above the upper limit of conditional formula (5), the movement amount of the fourth group is too large relative to the movement amount of the fifth group. Consequently, to secure the satisfactory focusing movement amount, it is necessary to secure a large distance between the third and fifth groups at the wide-angle end. As a result, the optical system becomes large or, to avoid that, it is necessary to increase the optical power of the fourth group, and this makes it difficult to suppress variation in astigmatism that accompanies the movement of the fourth group during focusing.

It is farther preferable that a zooming optical system according to the invention fulfill conditional formula (5a) below.

$$0.6 < M4/M5 < 0.9 \tag{5a}$$

This conditional formula (5a) defines, within the conditional range defined by conditional formula (5) above, a conditional range farther preferable from the above-mentioned and other standpoints. Accordingly, preferably, fulfilling conditional formula (5a) helps obtain the above-mentioned benefits more effectively.

It is preferable that a zooming optical system according to the invention fulfill conditional formulae (6) and (7) below.

$$0.3 < (\beta 3t/\beta 3w)/(ft/fw) < 0.7 \tag{6}$$

$$0.3 < (\beta 5t/\beta 5w)/(ft/fw) < 0.5 \tag{7}$$

where
$\beta 3w$ represents the paraxial lateral magnification of the third group at the wide-angle end;
$\beta 3t$ represents the paraxial lateral magnification of the third group at the telephoto end;
$\beta 5w$ represents the paraxial lateral magnification of the fifth group at the wide-angle end;
$\beta 5t$ represents the paraxial lateral magnification of the fifth group at the telephoto end;
fw represents the focal length of the zooming optical system at the wide-angle end; and
ft represents the focal length of the zooming optical system at the telephoto end.

Below the lower limit of conditional formula (6), the zooming action by the third group is insufficient. Below the lower limit of conditional formula (7), the zooming action by the fifth group is insufficient. As a result, to obtain the desired zoom ratio, it is necessary to increase the zooming action between the first and second groups. Consequently, the total length of the optical system at the telephoto end is increased or, to avoid that, the optical power of the second group is increased, and this makes it difficult to suppress variation in astigmatism and coma aberration during zooming. By contrast, above the upper limit of conditional formula (6), the zooming action by the third group is too strong. Consequently, it is difficult to suppress astigmatism and coma aberration during zooming. Above the upper limit of conditional formula (7), the movement amount of the fifth group is too large. Consequently, it is difficult to suppress variation in astigmatism and coma aberration that accompanies the movement of the fifth group.

It is further preferable that a zooming optical system according to the invention fulfill conditional formula (6a) below.

$$0.4 < (\beta 3t/\beta 3w)/(ft/fw) < 0.6 \tag{6a}$$

This conditional formula (6a) defines, within the conditional range defined by conditional formula (6) above, a conditional range further preferable from the above-mentioned and other standpoints. Accordingly, preferably, fulfilling conditional formula (6a) helps obtain the above-mentioned benefits more effectively.

It is preferable that a zooming optical system according to the invention fulfill conditional formula (8) below.

$$0.5 < (1-\beta 4t^2)\beta rt^2 < 6.0 \tag{8}$$

where
$\beta 4t$ represents the paraxial lateral magnification of the fourth group at the telephoto end; and
$\beta rt$ represents the paraxial lateral magnification by all of the fifth and any succeeding groups at the telephoto end.

Below the lower limit of conditional formula (8), the focus sensitivity of the fourth group is too low. Consequently, it is necessary to secure a large focusing movement region. As a result, it is necessary to secure a large distance between the third and fourth groups, and thus the optical system becomes large. Also, disadvantageously, the focusing speed becomes low. By contrast, above the upper limit of conditional formula (8), the focus sensitivity of the fourth group is too high. Consequently, disadvantageously, it is difficult to secure satisfactory stopping accuracy of the focusing group.

It is further preferable that a zooming optical system according to the invention fulfill conditional formula (8a) below.

$$0.6 < (1-\beta 4t^2)\beta rt^2 < 4.0 \tag{8a}$$

This conditional formula (8a) defines, within the conditional range defined by conditional formula (8) above, a conditional range further preferable from the above-mentioned and other standpoints. Accordingly, preferably, fulfilling conditional formula (8a) helps obtain the above-mentioned benefits more effectively.

It is preferable that the third group include, from the object side, a first positive lens element, a first negative lens element, and a second positive lens element, and that the first positive lens element have at least one aspherical surface whose positive optical power decreases toward the edge. The third group is the group that chiefly bears the converging action of the entire optical system, and is required to have a high positive optical power. Accordingly, it is preferable to arrange at least two positive lens elements there to secure a strong converging power. In addition, by arranging in the first positive lens element at least one surface whose optical power decreases toward the edge, it is possible to give the first positive lens element a high optical power while suppressing spherical aberration. As a result, it is possible to reduce the height of axial rays incident on the first negative lens element, and thus it is possible to give the first negative lens element an optical power necessary to effectively correct spherical aberration without reducing the converging power of the third group as a whole. In this way, it is possible to make the first negative lens element exert the action of correcting spherical aberration more reliably.

It is preferable that a zooming optical system according to the invention fulfill conditional formula (9) below.

$$\Delta PgF > 0.015 \tag{9}$$

where
$\Delta PgF$ represents the anomalous dispersion of the second positive lens element;
$\Delta PgF = PgF - \alpha gF - \beta gF \times vd$;
$PgF = (ng - nF)/(nF - nC)$;
ng represents the refractive index for the g-line;
nF represents the refractive index for the F-line;
nC represents the refractive index for the C-line;
$\alpha gF = 0.6483$;
$\beta gF = -0.0018$; and
vd represents the Abbe number of the lens material.

By using a material that fulfills conditional formula (9) for the second positive lens element in the third group, it is possible to effectively correct the lateral chromatic aberration secondary spectrum at the wide-angle end and the axial chromatic aberration secondary spectrum at the telephoto end.

It is further preferable that a zooming optical system according to the invention fulfill conditional formula (9a) below.

$$\Delta PgF > 0.030 \tag{9a}$$

This conditional formula (9a) defines, within the conditional range defined by conditional formula (9) above, a conditional range further preferable from the above-mentioned and other standpoints. Accordingly, preferably, fulfilling conditional formula (9a) helps obtain the above-mentioned benefits more effectively.

A zooming optical system according to the invention is suitable for use as an imaging lens system in a digital device equipped with an image input function (for example, a digital camera), and by combining it with an image sensing device or the like, it is possible to build an imaging optical device which optically captures an image of a subject to output it as an electrical signal. An imaging optical device is an optical device that constitutes a main component of a camera used to take a still or moving picture of a subject, and is composed of, for example, from the object side (that is, from the subject side), a zooming optical system which forms an optical image of an object and an image sensing device which converts the optical image formed by the zooming optical system into an electrical signal. By arranging a zooming optical system having the distinctive construction described above in such a way that the optical image of the subject is formed on the light receiving surface (that is, image sensing surface) of the image sensing device, it is possible to realize a compact, low-cost, high-performance imaging optical device and a digital device provided with it.

Examples of digital devices equipped with an image input function include cameras such as digital cameras, video cameras, surveillance cameras, vehicle-mounted cameras, and videophone cameras. Also included are personal computers, potable digital devices (for example, cellular phones, smart phones, and mobile computers), peripheral devices to those (for example, scanners and printers), other digital devices, and the like quipped with camera functions by having such functions incorporated in them or externally added to them. As these examples show, not only is it possible to build a camera by use of an imaging optical device, it is also possible to incorporate an imaging optical device in various devices to add camera functions to them. For example, it is possible to build a digital device equipped with an image input function, such as a camera-equipped cellular phone.

Figure 9:
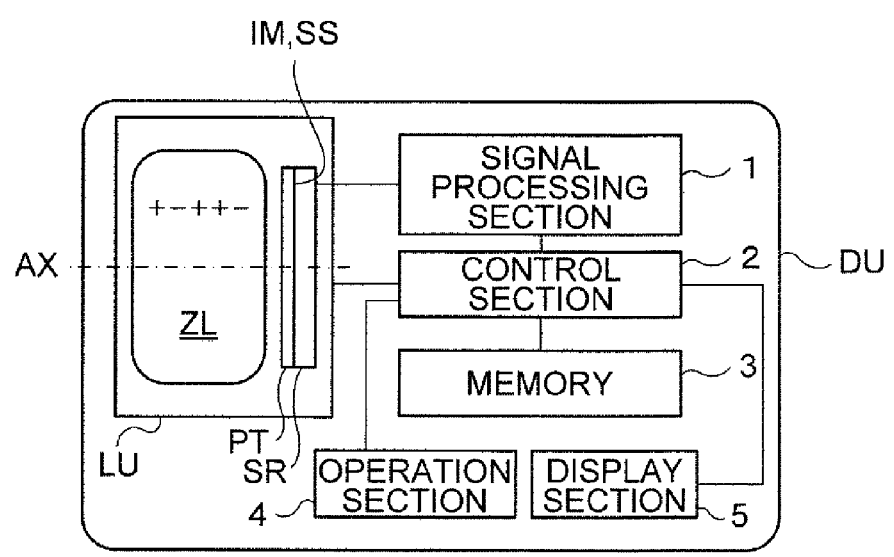
FIG. 9 is a schematic diagram showing an outline of an example of the configuration of a digital device incorporating a zooming optical system.

FIG. 9 shows, as an example of a digital device equipped with an image input function, an outline of an example of the configuration of a digital device DU in a schematic sectional view. The digital device DU shown in FIG. 9 incorporates an imaging optical device LU, which is composed of, from the object side (that is, from the subject side), a zoom lens system ZL (AX representing the optical axis) which forms an optical image (image plane) of an object in a zoomable fashion, a plane-parallel plate PT (corresponding to the cover glass of an image sensing device SR and, wherever applicable, optical filters that are arranged as necessary, such as an optical low-pass filter and an infrared cut filter), and an image sensing device SR which converts the optical image IM formed on the light receiving surface (image sensing surface) by the zoom lens system ZL into an electrical signal. When this imaging optical device LU is used to build a digital device DU equipped with an image input function, typically the former is arranged inside the body of the latter. To realize camera functions, any configuration may be adopted to suit the needs. For example, an imaging optical device LU built as a unit may be configured to be detachably attached to, or rotatably fitted to, the body of a digital device DU.

The zoom lens system ZL adopts a zoom arrangement that includes five groups, namely a positive, a negative, a positive, a positive, and a negative group, and is so configured as to achieve zooming (that is, magnification variation) by varying the axial distances between those groups and achieve focusing by moving the fourth group along the optical axis. It is moreover so configured that, during zooming, at least the third, fourth, and fifth groups move relative to the image plane IM, and that the optical image IM is formed on the light receiving surface SS of the image sensing device SR.

Used as the image sensing device SR is, for example, a solid-state image sensing device having a plurality of pixels, such as a CCD (charge-coupled device) image sensor or a CMOS (complementary metal-oxide semiconductor) image sensor. The zoom lens system ZL is so arranged that the optical image IM of the subject is formed on the light receiving surface SS, which is the photoelectric conversion portion of the image sensing device SR, and thus the optical image IM formed by the zoom lens system ZL is converted into en electrical signal by the image sensing device SR.

The digital device DU is provided with, other than the imaging optical device LU, a signal processing section 1, a control section 2, a memory 3, an operation section 4, a display section 5, etc. The signal generated by the image sensing device SR is subjected to predetermined digital image processing, image compression processing, and other processing in the signal processing section 1, and the resulting digital video signal is recorded to the memory 3 (such as a semiconductor memory or an optical disc) and, as the case may be, transferred to an external device (for example, a communication function of a cellular phone) across a cable or after being converted into an infrared signal. The control section 2 comprises a microprocessor, and performs, in a concentrated fashion, the control of picture taking functions (such as a still picture taking function and a moving picture taking function) and of functions such as an image playback function, the control of lens moving mechanisms for zooming, focusing, camera shake correction, etc., and other control. For example, the control section 2 controls the imaging optical device LU to perform at least the taking of a still picture of a subject or the taking of a moving picture of a subject. The display section 5 is a part that includes a display such as a liquid crystal monitor, and performs image display by use of the image signal resulting from the conversion by the image sensing device SR or image information recorded on the memory 3. The operation section 4 is a part that includes operated members such as operation buttons (for example, a shutter release button), operation dials (for example, a picture taking mode dial), and conveys the information entered through the user's operation to the control section 2.

Now, by way of a first to a fourth embodiment of the invention, specific optical constructions of the zoom lens system ZL will be described in more detail. FIGS. 1 to 4 are optical construction diagrams of the zoom lens system ZL in the first to fourth embodiments respectively, each showing the lens arrangement, optical path, etc. at the wide-angle end (W), in the middle focal length condition (M), and at the telephoto end (T).

In the first to fourth embodiments (FIGS. 1 to 4), included are, from the object side, a first group Gr1 having a positive optical power, a second group Gr2 having a negative optical power, a third group Gr3 having a positive optical power, a fourth group Gr4 having a positive optical power, and a fifth group Gr5 having a negative optical power, and a construction is adopted that achieves zooming by varying the axial distances of those groups. During zooming, at least the third, fourth, and fifth groups Gr3, Gr4, and Gr5 move relative to the image plane IM. An aperture stop ST is located to the object side of the third group Gr3, and moves together with the third group Gr3 during zooming. During focusing, the fourth group Gr4 moves along the optical axis AX. Thus, the fourth group Gr4 is the focusing lens group, and as indicated by arrow mF, moves toward the object side during focusing for a close-distance object.

In the first embodiment (FIG. 1), the zoom lens system ZL has a zoom arrangement that includes five groups, namely a positive, a negative, a positive, a positive, and a negative group, with all groups movable during zooming. During zooming from the wide-angle end (W) to the telephoto end (T), the first group Gr1 moves monotonously toward the object side; the second group Gr2 first moves toward the image side, then moves toward the object side, and then moves toward the image side again; the third to fifth groups Gr3 to Gr5 move monotonously toward the object side and then, short of the telephoto end (T), move toward the image side.

In the second embodiment (FIG. 2), the zoom lens system ZL has a zoom arrangement that includes six groups, namely a positive, a negative, a positive, a positive, a negative, and a positive group, with the first to fifth groups movable during zooming. During zooming from the wide-angle end (W) to the telephoto end (T), the first to fifth groups Gr1 to Gr5 moves monotonously toward the object side.

In the third embodiment (FIG. 3), the zoom lens system ZL has a zoom arrangement that includes five groups, namely a positive, a negative, a positive, a positive, and a negative group, with all groups movable during zooming. During zooming from the wide-angle end (W) to the telephoto end (T), the first group Gr1 moves monotonously toward the object side; the second group Gr2 first moves toward the image side, and then moves toward the object side; the third and fifth groups Gr3 and Gr5 move monotonously toward the object side; the fourth group Gr4 first moves toward the object side and then, short of the telephoto end (T), moves toward the image side.

In the fourth embodiment (FIG. 4), the zoom lens system ZL has a zoom arrangement that includes five groups, namely a positive, a negative, a positive, a positive, and a negative group, with all groups movable during zooming. During zooming from the wide-angle end (W) to the telephoto end (T), the first group Gr1 moves monotonously toward the object side; the second group Gr2 first moves toward the image side, and then moves toward the object side; the third and fifth groups Gr3 and Gr5 move monotonously toward the object side; the fourth group Gr4 first moves toward the object side and then, short of the telephoto end (T), moves toward the image side.

In the first embodiment (FIG. 1), each group is composed, from the object side, as follows. The first group Gr1 is composed of a single doublet lens element comprising a negative meniscus lens element concave to the image side and a positive meniscus lens element convex to the object side. The second group Gr2 is composed of a negative meniscus lens element concave to the image side and a doublet lens element comprising a biconcave negative lens element and a positive meniscus lens element convex to the object side. The third group Gr3 is composed of a biconvex first positive lens element L31 having aspherical surfaces on both sides (each being an aspherical surface whose positive optical power decreases toward the edge) and a doublet lens element comprising a biconcave first negative lens element L32 and a biconvex second positive lens element L33. To the object side of the third group Gr3, an aperture stop ST is arranged. The fourth group Gr4 is composed of a single positive meniscus lens element convex to the image side and having aspherical surfaces on both sides. The fifth group Gr5 is composed of a single negative meniscus lens element concave to the object side.

In the second embodiment (FIG. 2), each group is composed, from the object side, as follows. The first group Gr1 is composed of a single doublet lens element comprising a negative meniscus lens element concave to the image side and a positive meniscus lens element convex to the object side. The second group Gr2 is composed of a negative meniscus lens element concave to the image side and a doublet lens element comprising a biconcave negative lens element and a positive meniscus lens element convex to the object side. The third group Gr3 is composed of a biconvex first positive lens element L31 having aspherical surfaces on both sides (each being an aspherical surface whose positive optical power decreases toward the edge) and a doublet lens element comprising a biconcave first negative lens element L32 and a biconvex second positive lens element L33. To the object side of the third group Gr3, an aperture stop ST is arranged. The fourth group Gr4 is composed of a single positive meniscus lens element convex to the image side and having aspherical surfaces on both sides. The fifth group Gr5 is composed of a single biconcave negative lens element. The sixth group is composed of a single positive meniscus lens element convex to the image side.

In the third embodiment (FIG. 3), each group is composed, from the object side, as follows. The first group Gr1 is composed of a single doublet lens element comprising a negative meniscus lens element concave to the image side and a positive meniscus lens element convex to the object side. The second group Gr2 is composed of a negative meniscus lens element concave to the image side and a doublet lens element comprising a biconcave negative lens element and a biconvex positive lens element. The third group Gr3 is composed of a first positive lens element L31 having a meniscus shape convex to the object side and having aspherical surfaces on both sides (each being an aspherical surface whose positive optical power decreases toward the edge) and a doublet lens element comprising a first negative lens element L32 having a meniscus shape concave to the image side and a biconvex second positive lens element L33. To the object side of the third group Gr3, an aperture stop ST is arranged. The fourth group Gr4 is composed of a single positive meniscus lens element convex to the image side and having aspherical surfaces on both sides. The fifth group Gr5 is composed of a single negative meniscus lens element concave to the object side.

In the fourth embodiment (FIG. 4), each group is composed, from the object side, as follows. The first group Gr1 is composed of a single doublet lens element comprising a negative meniscus lens element concave to the image side and a positive meniscus lens element convex to the object side. The second group Gr2 is composed of a negative meniscus lens element concave to the image side and a doublet lens element comprising a biconcave negative lens element and a positive meniscus lens element convex to the object side. The third group Gr3 is composed of a biconvex first positive lens element L31 having aspherical surfaces on both sides (each being an aspherical surface whose positive optical power decreases toward the edge) and a doublet lens element comprising a biconcave first negative lens element L32 and a biconvex second positive lens element L33. To the object side of the third group Gr3, an aperture stop ST is arranged. The fourth group Gr4 is composed of a single biconvex positive lens element having aspherical surfaces on both sides. The fifth group Gr5 is composed of a single negative meniscus lens element concave to the object side.

EXAMPLE

Hereinafter, the construction etc. of zooming optical systems embodying the present invention will be presented in more detail with reference to the construction data etc. of practical examples. Examples 1 to 4 (EX1 to EX4) presented below are numerical examples of the first to fourth embodiments, respectively, described above, and the optical construction diagrams (FIGS. 1 to 4) showing the first to fourth embodiments also show the lens arrangement, optical path, etc. of the corresponding ones of Examples 1 to 4 respectively.

In the construction data of each practical example, listed as surface data are, from the leftmost column rightward, the surface number, the radius of curvature r (mm), the axial surface-to-surface distance d (mm), the refractive index nd for the d-line (with a wavelength of 587.56 nm), and the Abbe number for the d-line. A surface whose number is marked with an asterisk (*) is an aspherical surface, of which the shape is defined by formula (AS) below in a local rectangular coordinate system (x, y, z) with its origin at the vertex of the surface. Listed as aspherical surface data are aspherical surface coefficients etc. In the aspherical surface data of each practical example, any missing term has a coefficient of 0, and for all the data, "E-n" stands for "$\times 10^{-n}$."

$$z=(c \cdot h^2)/[1+\sqrt{1-(1+K) \cdot c^2 \cdot h^2}]+\Sigma(Aj \cdot h^j) \qquad (AS)$$

where
- h represents the height in a direction perpendicular to the z-axis (optical axis AX) ($h^2=x^2+y^2$);
- z represents the amount of sag in the direction of the optical axis AX at the height h (relative to the vertex);
- c represents the curvature at the vertex (the reciprocal of the radius of curvature r);
- K represents the conic constant; and
- Aj represents the aspherical surface coefficient of order j.

Listed as miscellaneous data are the zoom ratio (magnification variation ratio) and, for each of the different focal length conditions W, M, and T, the focal length of the entire optical system (f, mm), the f-number (FNO), the half angle-of-view (ω, degrees), the image height (Y', mm), the total lens length (TL, mm), the back focus (BF, mm), and the variable surface-to-surface distances di (i representing the surface number; mm). Listed as zooming lens group data are the focal lengths (f1, f2, f3, f4, f5, f6; mm) of the individual lens groups. Here, the back focus BF is the distance from the image-side surface of the plane-parallel plate PT to the image plane IM, and the total lens length is the distance from the foremost lens surface to the image plane IM. Table 1 shows data related to the conditional formulae in each practical example, and Table 2 shows the values of the conditional formulae in each practical example.

FIGS. 5A-5I to 8A-8I are aberration diagrams (showing longitudinal aberrations in the condition focused on infinity) corresponding to Examples 1 to 4 (EX1 to EX4) respectively, showing the aberrations observed at different zoom positions. Specifically, FIGS. 5A to 8A, 5D to 8D, and 5G to 8G show spherical aberration etc., FIGS. 5B to 8B, 5E to 8E, and 5H to 8H show astigmatism, and FIGS. 5C to 8C, 5F to 8F, and 5I to 8I show distortion, FIGS. 5A to 8A, 5B to 8B, and 5C to 8C showing the aberrations at the wide-angle end (W), FIGS. 5D to 8D, 5E to 8E, and 5F to 8F showing the aberrations at the middle (M), and FIGS. 5G to 8G, 5H to 8H, and 5I to 8I showing the aberrations at the telephoto end (T).

In FIGS. 5A-5I to 8A-8I, FNO represents the f-number, and Y' (mm) represents the maximum image height (corresponding to the distance from the optical axis AX) on the light receiving surface SS of the image sensing device SR. In the spherical aberration diagrams, a solid line d, a dash-and-dot line g, and a dash-dot-dot line c indicate the spherical aberration (mm) for the d-, g-, and c-lines respectively, and a broken line SC indicates the deviation (mm) from the sine condition. In the astigmatism diagrams, a broken line DM represents the meridional image surface and a solid line DS represents the sagittal image surface, each indicating the astigmatism (mm) for the d-line. In the distortion diagrams, a solid line indicates the distortion (%) for the d-line.

Example 1

Unit: mm

Surface Data

| Surface No. | r | d | nd | vd |
|---|---|---|---|---|
| 1 | 43.920 | 2.200 | 1.84666 | 23.78 |
| 2 | 31.860 | 5.859 | 1.72916 | 54.66 |
| 3 | 128.093 | Variable | | |
| 4 | 70.710 | 1.200 | 1.83400 | 37.35 |
| 5 | 12.305 | 9.331 | | |
| 6 | −57.304 | 0.800 | 1.56732 | 42.85 |
| 7 | 15.475 | 3.288 | 1.84666 | 23.78 |
| 8 | 113.257 | Variable | | |
| 9 (Aperture) | ∞ | 1.000 | | |
| 10* | 11.255 | 4.134 | 1.58313 | 59.38 |
| 11* | −41.229 | 0.998 | | |
| 12 | −76.032 | 1.000 | 1.70154 | 41.15 |
| 13 | 7.695 | 7.744 | 1.49700 | 81.61 |
| 14 | −17.959 | Variable | | |
| 15* | −15.747 | 3.259 | 1.49710 | 81.56 |
| 16* | −11.320 | Variable | | |
| 17 | −17.404 | 1.000 | 1.72916 | 54.66 |
| 18 | −181.898 | Variable | | |
| 19 | ∞ | 3.000 | 1.51680 | 64.20 |
| 20 | ∞ | BF | | |

Aspherical Surface Data

| | K | A4 | A6 | A8 |
|---|---|---|---|---|
| Surface 10 | 0.0000 | −1.91115E−05 | −4.46317E−07 | 9.77551E−09 |
| Surface 11 | 0.0000 | 7.87781E−05 | −3.42308E−07 | 8.79927E−09 |
| Surface 15 | 0.0000 | −2.06680E−04 | −1.67531E−06 | −2.34208E−08 |
| Surface 16 | 0.0000 | −8.32799E−05 | −7.41376E−07 | −1.02402E−08 |

Miscellaneous Data
Zoom Ratio 3.111

| | Wide-angle(W) | Middle (M) | Telephoto (T) |
|---|---|---|---|
| Focal Length | 18.000 | 31.750 | 56.000 |
| F-number | 3.550 | 4.000 | 4.550 |
| Half Angle-of-View | 38.270 | 24.096 | 14.229 |
| Image Height | 12.916 | 14.188 | 14.543 |
| Total Lens Length | 83.000 | 89.486 | 107.818 |
| BF | 1.000 | 1.000 | 1.000 |
| d3 | 0.500 | 8.676 | 25.427 |
| d8 | 16.843 | 6.938 | 1.710 |
| d14 | 3.261 | 4.366 | 5.824 |
| d16 | 4.583 | 3.478 | 2.020 |
| d18 | 12.000 | 20.215 | 27.024 |

Unit: mm

Zooming Lens Group Data

| Group | Starting Surface | Focal Length |
|---|---|---|
| 1 | 1 | 96.021 |
| 2 | 4 | −18.306 |
| 3 | 9 | 19.119 |
| 4 | 15 | 65.083 |
| 5 | 17 | −26.462 |

Example 2

Unit: mm

Surface Data

| Surface No. | r | d | nd | vd |
|---|---|---|---|---|
| 1 | 42.371 | 2.200 | 1.84666 | 23.78 |
| 2 | 27.997 | 7.469 | 1.77250 | 49.65 |
| 3 | 208.393 | Variable | | |
| 4 | 98.898 | 1.200 | 1.83400 | 37.35 |
| 5 | 11.821 | 10.174 | | |
| 6 | −82.294 | 0.800 | 1.56384 | 60.82 |
| 7 | 13.917 | 2.746 | 1.84666 | 23.78 |
| 8 | 54.287 | Variable | | |
| 9 (Aperture) | ∞ | 1.000 | | |
| 10* | 11.292 | 3.990 | 1.58313 | 59.38 |
| 11* | −37.006 | 1.579 | | |
| 12 | −38.215 | 1.011 | 1.72342 | 37.99 |
| 13 | 8.307 | 7.436 | 1.49700 | 81.61 |
| 14 | −14.821 | Variable | | |
| 15* | −49.843 | 3.518 | 1.74330 | 49.33 |
| 16* | −19.928 | Variable | | |
| 17 | −22.425 | 1.000 | 1.78590 | 43.93 |
| 18 | 85.580 | Variable | | |
| 19 | −628.884 | 1.532 | 1.90366 | 31.31 |
| 20 | −123.408 | 12.000 | | |
| 21 | ∞ | 3.000 | 1.51680 | 64.20 |
| 22 | ∞ | BF | | |

Aspherical Surface Data

| | K | A4 | A6 | A8 |
|---|---|---|---|---|
| Surface 10 | 0.0000 | −2.82861E−05 | −2.80618E−07 | 9.22021E−09 |
| Surface 11 | 0.0000 | 7.34941E−05 | −1.10920E−07 | 7.43180E−09 |
| Surface 15 | 0.0000 | −1.93234E−04 | −1.13457E−06 | −2.45347E−08 |
| Surface 16 | 0.0000 | −1.41680E−04 | −8.01688E−07 | −9.50276E−09 |

Miscellaneous Data
Zoom Ratio 3.111

| | Wide-angle(W) | Middle (M) | Telephoto (T) |
|---|---|---|---|
| Focal Length | 18.000 | 31.750 | 56.000 |
| F-number | 3.550 | 4.000 | 4.550 |
| Half Angle-of-View | 38.270 | 24.097 | 14.229 |
| Image Height | 12.927 | 14.248 | 14.808 |
| Total Lens Length | 83.000 | 90.399 | 108.000 |
| BF | 1.000 | 1.000 | 1.000 |
| d3 | 0.500 | 6.627 | 19.439 |
| d8 | 12.985 | 4.996 | 1.913 |
| d14 | 2.491 | 2.909 | 4.905 |
| d16 | 4.415 | 3.996 | 2.000 |
| d18 | 0.955 | 10.217 | 18.089 |

Zooming Lens Group Data

| Group | Starting Surface | Focal Length |
|---|---|---|
| 1 | 1 | 71.177 |
| 2 | 4 | −15.173 |

-continued

Unit: mm

| | | |
|---|---|---|
| 3 | 9 | 19.866 |
| 4 | 15 | 42.536 |
| 5 | 17 | −22.518 |
| 6 | 19 | 169.662 |

Example 3

Unit: mm

Surface Data

| Surface No. | r | d | nd | vd |
|---|---|---|---|---|
| 1 | 56.021 | 2.200 | 1.84666 | 23.78 |
| 2 | 35.177 | 5.817 | 1.77250 | 49.65 |
| 3 | 322.567 | Variable | | |
| 4 | 37.447 | 1.200 | 1.90366 | 31.31 |
| 5 | 13.054 | 9.095 | | |
| 6 | −17.897 | 0.800 | 1.48749 | 70.45 |
| 7 | 23.009 | 2.412 | 1.84666 | 23.78 |
| 8 | −5284.098 | Variable | | |
| 9 (Aperture) | ∞ | 1.000 | | |
| 10* | 14.100 | 2.647 | 1.58313 | 59.38 |
| 11* | 166.870 | 0.806 | | |
| 12 | 66.419 | 1.000 | 1.72342 | 37.99 |
| 13 | 11.739 | 10.724 | 1.49700 | 81.61 |
| 14 | −13.942 | Variable | | |
| 15* | −23.916 | 2.217 | 1.49710 | 81.56 |
| 16* | −17.177 | Variable | | |
| 17 | −14.128 | 1.000 | 1.90366 | 31.31 |
| 18 | −33.139 | Variable | | |
| 19 | ∞ | 3.000 | 1.51680 | 64.20 |
| 20 | ∞ | BF | | |

Aspherical Surface Data

| | K | A4 | A6 | A8 |
|---|---|---|---|---|
| Surface 10 | 0.0000 | 2.19144E−05 | 5.65984E−07 | 4.44506E−09 |
| Surface 11 | 0.0000 | 1.29414E−04 | 1.03284E−06 | 4.14428E−09 |
| Surface 15 | 0.0000 | −1.75687E−04 | −3.31203E−08 | −1.28446E−08 |
| Surface 16 | 0.0000 | −1.33265E−04 | 7.41900E−08 | −8.73663E−09 |

Miscellaneous Data
Zoom Ratio 3.110

| | Wide-angle(W) | Middle (M) | Telephoto (T) |
|---|---|---|---|
| Focal Length | 18.003 | 31.754 | 55.989 |
| F-number | 3.550 | 4.000 | 4.550 |
| Half Angle-of-View | 38.265 | 24.094 | 14.232 |
| Image Height | 12.982 | 14.219 | 14.814 |
| Total Lens Length | 83.002 | 87.391 | 107.996 |
| BF | 1.002 | 1.001 | 0.996 |
| d3 | 0.723 | 6.780 | 24.395 |
| d8 | 15.564 | 5.395 | 1.500 |
| d14 | 5.680 | 4.463 | 7.797 |
| d16 | 4.117 | 5.334 | 2.000 |
| d18 | 12.000 | 20.502 | 27.392 |

Zooming Lens Group Data

| Group | Starting Surface | Focal Length |
|---|---|---|
| 1 | 1 | 92.646 |
| 2 | 4 | −16.885 |
| 3 | 9 | 18.436 |
| 4 | 15 | 110.553 |
| 5 | 17 | −27.949 |

Example 4

Unit: mm

Surface Data

| Surface No. | r | d | nd | vd |
|---|---|---|---|---|
| 1 | 41.791 | 2.200 | 1.84666 | 23.78 |
| 2 | 27.463 | 6.970 | 1.80420 | 46.49 |
| 3 | 116.494 | Variable | | |
| 4 | 50.736 | 1.200 | 1.83481 | 42.72 |
| 5 | 10.693 | 8.256 | | |
| 6 | −40.325 | 0.800 | 1.48749 | 70.45 |
| 7 | 14.459 | 4.306 | 1.90366 | 31.31 |
| 8 | 48.408 | Variable | | |
| 9 (Aperture) | ∞ | 1.000 | | |
| 10* | 11.911 | 3.827 | 1.58313 | 59.38 |
| 11* | −54.577 | 1.766 | | |
| 12 | −214.156 | 3.562 | 1.83400 | 37.35 |
| 13 | 9.230 | 3.897 | 1.49700 | 81.61 |
| 14 | −19.179 | Variable | | |
| 15* | 78.621 | 1.224 | 1.83441 | 37.28 |
| 16* | −1935.117 | Variable | | |
| 17 | −21.758 | 1.000 | 1.49700 | 81.61 |
| 18 | −43.189 | Variable | | |
| 19 | ∞ | 3.000 | 1.51680 | 64.20 |
| 20 | ∞ | BF | | |

Aspherical Surface Data

| | K | A4 | A6 | A8 |
|---|---|---|---|---|
| Surface 10 | 0.0000 | −2.99911E−05 | −7.41608E−07 | 1.28111E−08 |
| Surface 11 | 0.0000 | 5.37650E−05 | −6.96376E−07 | 1.63874E−08 |
| Surface 15 | 0.0000 | −8.91337E−05 | −1.25301E−06 | −1.27467E−08 |
| Surface 16 | 0.0000 | −8.99199E−05 | −1.40522E−06 | −8.90861E−09 |

Miscellaneous Data
Zoom Ratio 3.111

| | Wide-angle(W) | Middle (M) | Telephoto (T) |
|---|---|---|---|
| Focal Length | 18.000 | 31.750 | 55.998 |
| F-number | 3.550 | 4.000 | 4.550 |
| Half Angle-of-View | 38.270 | 24.097 | 14.229 |
| Image Height | 12.886 | 13.990 | 14.257 |
| Total Lens Length | 83.000 | 91.534 | 107.998 |
| BF | 1.000 | 1.000 | 0.998 |
| d3 | 0.500 | 9.118 | 22.200 |
| d8 | 15.182 | 6.694 | 1.933 |
| d14 | 3.217 | 4.878 | 8.737 |
| d16 | 8.094 | 6.434 | 2.575 |
| d18 | 12.000 | 20.404 | 28.549 |

Zooming Lens Group Data

| Group | Starting Surface | Focal Length |
|---|---|---|
| 1 | 1 | 79.91 |
| 2 | 4 | −15.443 |
| 3 | 9 | 21.667 |
| 4 | 15 | 90.57 |
| 5 | 17 | −89.615 |

TABLE 1

| Related Data | Example 1 | Example 2 | Example 3 | Example 4 |
|---|---|---|---|---|
| M5 | 15.024 | 17.133 | 15.392 | 16.549 |
| fw | 18.000 | 18.000 | 18.003 | 18.000 |
| ft | 56.000 | 56.000 | 55.989 | 55.998 |
| f3 | 19.119 | 19.866 | 18.436 | 21.667 |
| f4 | 65.083 | 42.536 | 110.553 | 90.570 |
| f5 | −26.462 | −22.518 | −27.949 | −89.615 |
| M4 | 12.461 | 14.719 | 13.275 | 11.030 |
| β3t | −0.795 | −0.949 | −0.827 | −1.551 |

TABLE 1-continued

| Related Data | Example 1 | Example 2 | Example 3 | Example 4 |
|---|---|---|---|---|
| β3w | −0.525 | −0.691 | −0.542 | −0.890 |
| β5t | 2.158 | 2.586 | 2.120 | 1.367 |
| β5w | 1.590 | 1.826 | 1.570 | 1.182 |
| β4t | 0.821 | 0.656 | 0.883 | 0.706 |
| βrt | 2.158 | 2.361 | 2.120 | 1.367 |
| PgF | 15.024 | 17.133 | 15.392 | 16.549 |

TABLE 2

| Values of Conditional Formulae | Example 1 | Example 2 | Example 3 | Example 4 |
|---|---|---|---|---|
| (1) M5/f5 | −0.568 | −0.761 | −0.551 | −0.185 |
| (2) f5/fw | −1.470 | −1.251 | −1.552 | −4.979 |
| (3) f4/f3 | 3.404 | 2.141 | 5.997 | 4.180 |
| (4) f5/f3 | −1.384 | −1.133 | −1.516 | −4.136 |
| (5) M4/M5 | 0.829 | 0.859 | 0.862 | 0.666 |
| (6) (β3t/β3w)/(ft/fw) | 0.487 | 0.441 | 0.491 | 0.560 |
| (7) (β5t/β5w)/(ft/fw) | 0.436 | 0.455 | 0.434 | 0.372 |
| (8) $(1-\beta 4t^2)\beta rt^2$ | 1.522 | 3.179 | 0.993 | 0.936 |
| (9) ΔPgF | 0.037 | 0.037 | 0.037 | 0.037 |

What is claimed is:

1. A zooming optical system comprising, from an object side, a first group having a positive optical power, a second group having a negative optical power, a third group having a positive optical power, a fourth group having a positive optical power, and a fifth group having a negative optical power, the zooming optical system achieving zooming by varying axial distances between the individual groups, wherein
during zooming, at least the third, fourth, and fifth groups move relative to an image plane,
focusing is achieved by moving the fourth group along an optical axis, and
conditional formulae (1), (3) and (5) below are fulfilled:

$$-1.0 < M5/f5 < -0.1 \tag{1}$$

$$1.0 < f4/f3 < 6.0 \tag{3}$$

$$0.5 < M4/M5 < 1.0 \tag{5}$$

where
M4 represents a distance along the optical axis from a position of the fourth group at the wide-angle end to a position of the fourth group at the telephoto end;
M5 represents a distance along the optical axis from a position of the fifth group at a wide-angle end to a position of the fifth group at a telephoto end;
f3 represents a focal length of the third group;
f4 represents a focal length of the fourth group; and
f5 represents a focal length of the fifth group.

2. The zooming optical system according to claim 1, wherein during zooming, the third and fifth groups move as a single unit.

3. The zooming optical system according to claim 2, wherein during zooming, the third group, a driving member for moving the fourth group for focusing, and the fifth group move as a single unit.

4. The zooming optical system according to claim 2, wherein conditional formula (2) below is fulfilled:

$$-6.0 < f5/fw < -1.0 \tag{2}$$

where
fw represents a focal length of the zooming optical system at the wide-angle end.

5. The zooming optical system according to claim 2, wherein conditional formula (4) below is fulfilled:

$$-6.0 < f5/f3 < -0.8. \tag{4}$$

6. The zooming optical system according to claim 2, wherein conditional formulae (6) and (7) below are fulfilled:

$$0.3 < (\beta 3t/\beta 3w)/(ft/fw) < 0.7 \tag{6}$$

$$0.3 < (\beta 5t/\beta 5w)/(ft/fw) < 0.5 \tag{7}$$

where
β3w represents a paraxial lateral magnification of the third group at the wide-angle end;
β3t represents a paraxial lateral magnification of the third group at the telephoto end;
β5w represents a paraxial lateral magnification of the fifth group at the wide-angle end;
β5t represents a paraxial lateral magnification of the fifth group at the telephoto end;
fw represents a focal length of the zooming optical system at the wide-angle end; and
ft represents a focal length of the zooming optical system at the telephoto end.

7. The zooming optical system according to claim 2, wherein conditional formula (8) below is fulfilled:

$$0.5 < (1-\beta 4t^2)\beta rt^2 < 6.0 \tag{8}$$

where
β4t represents a paraxial lateral magnification of the fourth group at the telephoto end; and
βrt represents a paraxial lateral magnification by all of the fifth and any succeeding group at the telephoto end.

8. The zooming optical system according to claim 1, wherein conditional formulae (6) and (7) below are fulfilled:

$$0.3 < (\beta 3t/\beta 33w)/(ft/fw) < 0.7 \tag{6}$$

$$0.3 < (\beta 5t/\beta 5w)/(ft/fw) < 0.5 \tag{7}$$

where
β3w represents a paraxial lateral magnification of the third group at the wide-angle end;
β3t represents a paraxial lateral magnification of the third group at the telephoto end;
β5w represents a paraxial lateral magnification of the fifth group at the wide-angle end;
β5t represents a paraxial lateral magnification of the fifth group at the telephoto end;
fw represents a focal length of the zooming optical system at the wide-angle end; and
ft represents a focal length of the zooming optical system at the telephoto end.

9. The zooming optical system according to claim 1, wherein conditional formula (8) below is fulfilled:

$$0.5 < (1-\beta 4t^2)\beta rt^2 < 6.0 \tag{8}$$

where
β4t represents a paraxial lateral magnification of the fourth group at the telephoto end; and
βrt represents a paraxial lateral magnification by all of the fifth and any succeeding group at the telephoto end.

10. The zooming optical system according to claim 1, wherein
the third group includes, from the object side, a first positive lens element, a first negative lens element, and a second positive lens element, and
the first positive lens element has at least one aspherical surface whose positive optical power decreases toward an edge.

11. The zooming optical system according to claim 10, wherein conditional formula (9) below is fulfilled:

$$\Delta PgF > 0.015 \quad (9)$$

where
ΔPgF represents an anomalous dispersion of the second positive lens element;
ΔPgF=PgF−αgF−βgF×vd;
PgF=(ng−nF)/(nF−nC);
ng represents a refractive index for a g-line;
nF represents a refractive index for an F-line;
nC represents a refractive index for a C-line;
αgF=0.6483;
βgF=−0.0018; and
vd represents an Abbe number of a lens material.

12. The zooming optical system according to claim 1, wherein during zooming, the third group, a driving member for moving the fourth group for focusing, and the fifth group move as a single unit.

13. The zooming optical system according to claim 1, wherein conditional formula (2) below is fulfilled:

$$-6.0 < f5/fw < -1.0 \quad (2)$$

where
fw represents a focal length of the zooming optical system at the wide-angle end.

14. The zooming optical system according to claim 1, wherein conditional formula (4) below is fulfilled:

$$-6.0 < f5/f3 < -0.8. \quad (4)$$

15. An imaging optical device comprising:
the zooming optical system according to claim 1; and
an image sensing device for converting an optical image formed on a light receiving surface into an electrical signal,
wherein the zooming optical system is arranged such that an optical image of a subject is formed on a light receiving surface of the image sensing device.

16. A digital device comprising the imaging optical device according to claim 15 so as to be additionally equipped with at least a function of taking a still picture of the subject or a function of taking a moving picture of the subject.

* * * * *